Oct. 29, 1968  B. N. McDONALD  3,407,625
VAPOR GENERATOR

Filed Sept. 1, 1966  2 Sheets-Sheet 1

INVENTOR.
Bertrand N. McDonald
BY
ATTORNEY

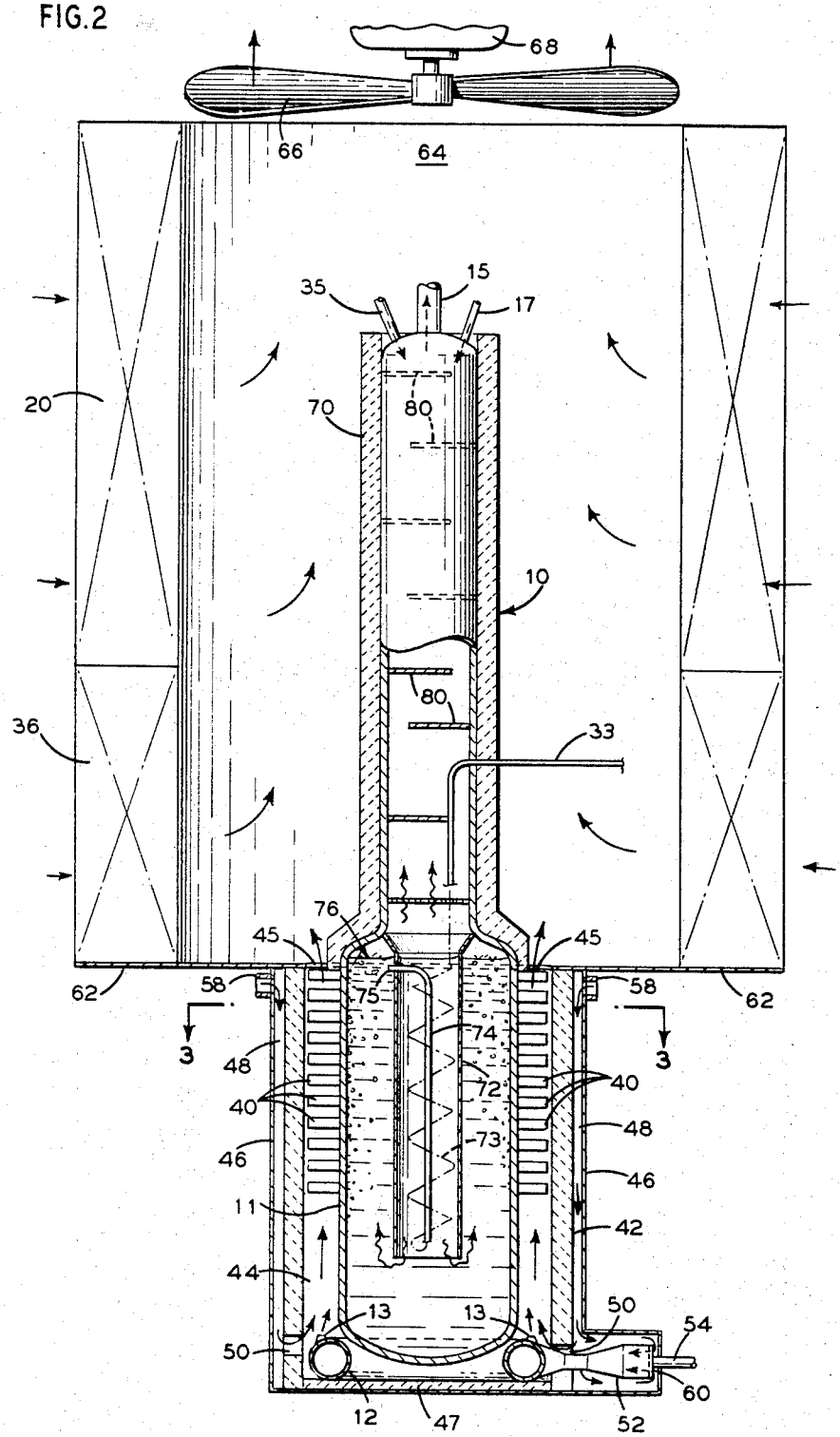

United States Patent Office 3,407,625
Patented Oct. 29, 1968

3,407,625
VAPOR GENERATOR
Bertrand N. McDonald, Akron, Ohio, assignor to The Babcock & Wilcox Company, New York, N.Y., a corporation of New Jersey
Continuation-in-part of application Ser. No. 367,993, May 18, 1964. This application Sept. 1, 1966, Ser. No. 592,955
9 Claims. (Cl. 62—476)

ABSTRACT OF THE DISCLOSURE

A vapor generator unit for an absorption refrigerator in which refrigerant vapors are generated from liquid contained within an upright vessel heated externally along its lower length portion by hot gases flowing upwardly in an annular passage defined by a wall surrounding the lower portion of the vessel, these hot gases being liberated within the annular passage by the ignition therein of fuel gases supplied through an annular gas burner located within the passage adjacent to the lower end of the vessel.

---

This invention relates to fluid heaters, and more particularly to vapor generators, especially those employed in refrigeration systems of the absorption type.

The present application is a continuation-in-part of application Ser. No. 367,993, filed May 18, 1964, now abandoned.

Prior art vapor generators of the type set forth are usually disadvantageous either from the standpoint of high manufacturing costs or because of relatively low operating efficiency. Thus, it is the principal concern of the present invention to provide a vapor generator capable of operating at high efficiency and which can be economically manufactured.

Vapor generators constructed according to the present invention include a vessel and a wall of insulating refractory material extending about the vessel so as to define an exhaust passageway between the insulating wall and the vessel. A burner or other suitable heating means is operatively associated with the vessel, preferably in subjacent relationship therewith, in order to vaporize ammonia in an ammonia solution which is contained within the vessel. Further provided is means for conveying air to the burner, after which the hot gas flows through the exhaust passageway. In order to improve the thermal efficiency of the above described generator the vessel includes wall structure provided with extended heat transfer surfaces positioned within the exhaust passageway to improve the transfer of convection heat from the hot gas to the vessel wall. Moreover, the thermal efficiency is still further improved because use is made of heat reflected from the insulating wall to the vessel.

A casing extending about the insulating wall may also be provided, in which case it is preferred that the casing and the insulating wall be spaced apart so as to provide an annular air intake passageway communicating with the atmosphere through inlet means at the upper portion of the casing. Inlet air moving downwardly through the intake passageway to the burner now cools the casing while at the same time absorbing heat by convection from the insulating wall. This also accomplishes preheating of inlet air which further improves the overall thermal efficiency of the system.

The above-described vapor generator is not only operationally efficient, but it also lends itself well to compact, efficient and economical construction.

A vapor generator constructed as set forth is especially well suited for absorption type refrigeration systems, and such a system is described hereinafter.

The various objects, features and advantages of the invention will appear more fully from the detailed description which follows, taken in connection with the accompanying drawings forming a part of the present application and in which:

FIG. 2 is a vertical sectional view of a vapor generator constructed and arranged according to the present invention.

Figure 1:
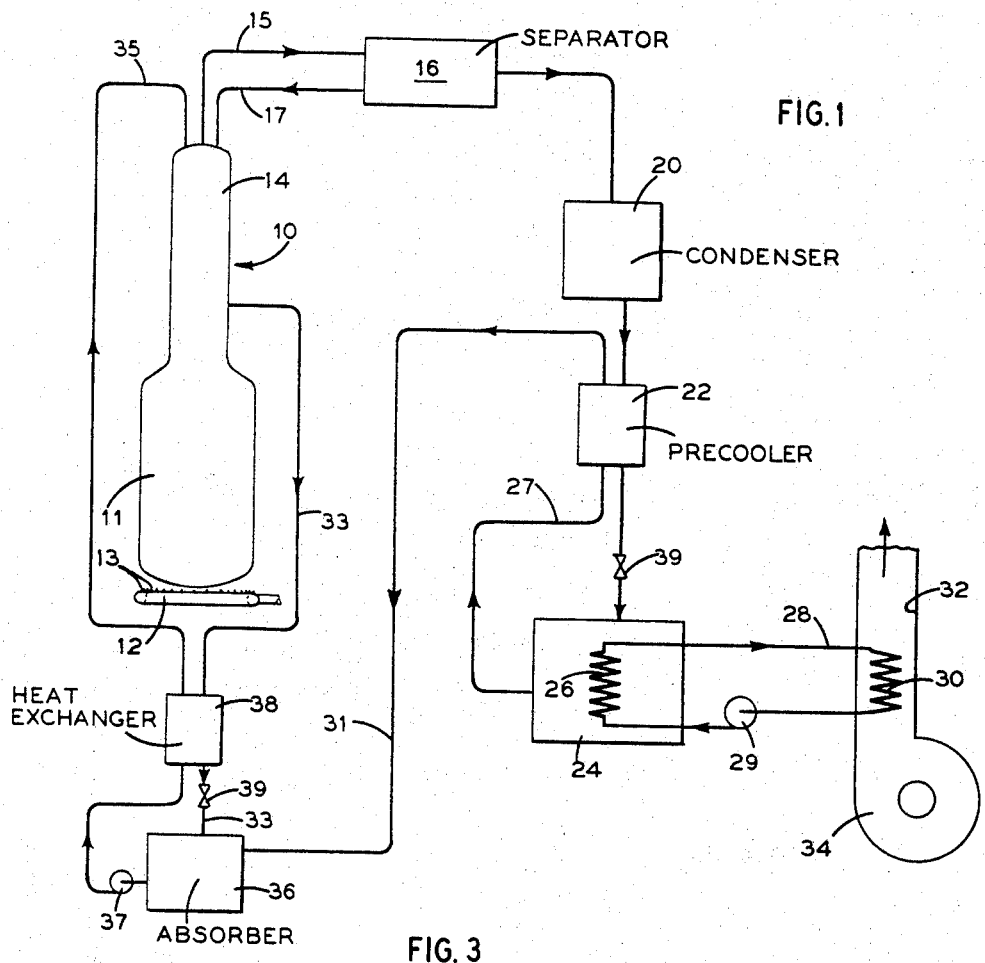
FIG. 1 is a diagrammatic view of an absorption type refrigeration system employing a vapor generator embodying the present invention.
Figure 3:
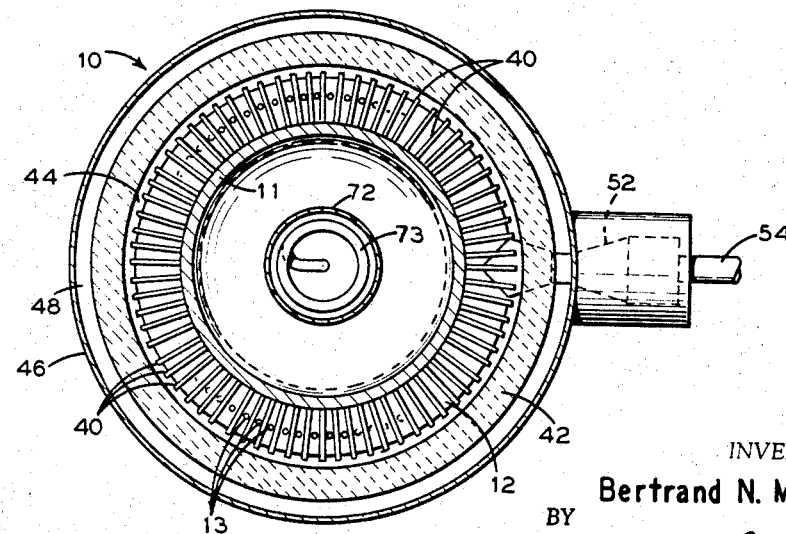
FIG. 3 is a horizontal sectional view of the vapor generator, taken along line 3—3 of FIG. 2.

Although it is not so limited the invention, as disclosed herein, is employed in an absorption type refrigeration system which will now be described with reference to FIG. 1.

The vapor generator designated by the numeral 10, includes a vessel 11 containing an aqueous solution of ammonia which is heated by indirect heat transfer from a ring type gas burner 12 having ports 13. Vaporous ammonia is driven out of solution by heat and the ammonia vapor passes through an analyzer portion 14 of generator 10, carrying with it some entrained water. This water and ammonia vapor flow through line 15 to the separator or rectifier 16 where they are separated, the water flowing back through line 17 to the analyzer 14, while the ammonia vapor moves onto a condenser 20. In the condenser 20, the ammonia vapor is liquified by a reduction of temperature, the heat removed to effect condensation being rejected to circulating air. The liquid ammonia then flows through a precooler 22 and into an evaporator 24, in indirect heat transfer relationship with the coils 26 of a closed cooling circuit 28. The cooling circuit 28 contains water or other suitable medium which circulates by means of a pump 29 through the coils 26 and then through a heat exchange unit 30, located in an enclosure, such as an air conditioning duct 32, and having an air propelling fan 34 operatively associated therewith.

The heat transfer between the cold liquid ammonia and the warm water of the air cooling circuit 28 which takes place in evaporator 24 results in evaporation of the ammonia by absorption of heat from the water, with the result that the water which is returned to the heat exchange unit 30 in the duct 32 is at reduced temperature, for example 50° F. The ammonia vapor passes via line 27 through precooler 22, where it is in heat transfer relationship with the effluent from the condenser 20, and then it continues on to an absorber 36 where it is absorbed in water or mixed with the weak (say 5%) ammonia solution supplied by line 33 from the analyzer 14 to produce a more concentrated ammonia-water solution (usually 40%). This solution flows through line 35 under pressure from a pump 37 to the vapor generator and enters the analyzer 14, thereby completing the cycle. A heat exchanger 38 effects a transfer of heat from the warm, weak solution to the colder, more highly concentrated solution which is pumped back to the vapor generator 10 by pump 37.

Flow restriction means 39, such as an expansion valve or capillary tube, when required, are employed in the line from the precooler 22 to the evaporator 24, and also in the line leading from the heat exchanger 38 to the absorber 36, to reduce fluid pressure, with consequent reduction in fluid temperature.

Referring now to FIG. 2, there is shown centrally of the assembly the vertically disposed vapor generator 10 including vessel 11. The vessel 11 has an enlarged lower portion provided with circumferential rows of studs 40 integrally attached to the vessel wall and extending radially outwardly therefrom. The studs 40 provide extended heat transfer surface for the vessel, augmenting the convection heat transfer of the vessel wall itself and thereby increasing the thermal efficiency of the vapor generator 10.

Formed about the vessel 11 and in laterally spaced relation thereto is a generally cylindrical insulating wall 42 of refractory insulating material, defining between the vessel 11 and the wall 42 an annular exhaust, or inner passageway 44 in which is disposed the aforementioned studs 40. Arranged about the insulating wall 42 is a generally cylindrical, air tight casing 46, disposed in spaced relation thereto so as to provide an annular outer, or air intake passageway 48 between the insulating wall 42 and the casing 46. The bottom wall of the casing 46 is lined inside with a floor 47 of refractory insulating material, abutting the lower end of the cylindrical insulating wall 42.

In the lower end portion of the insulating wall 42 there are circumferentially disposed radially extending openings 50 providing a passageway communicating between the intake passageway 48 and the exhaust passageway 44. At least one of the openings 50 is sized to admit a gas pipe 52 for delivering gaseous fuel from a gas supply line 54 to the annular or ring-type gas burner 12 to provide a source of heat at the lower end of the exhaust passageway 44.

Adjacent the upper end of the casing 46 a plurality of inlet openings are formed to provide air inlet means to the intake passageway 48, and there also is provided an air register 58 operatively associated with the casing 46 at the inlet openings in order to adjustably control the total quantity of combustion air for the burner 12 which is admitted to the air intake passageway 48. As shown in FIG. 2 the air register 58 is in registry with the inlet openings formed in the upper end of the casing 46.

The flow of primary air to the gas pipe 52 is adjustably controlled by means of an air register 60. The secondary air enters the passageway 44 via openings 50 and mixes with the burning fuel-primary air mixture.

Further provided is an annular partition 62 extending radially and perpendicularly in relation to the axis of the vessel 11. The partition 62 serves to support thereon the condenser 20 and the absorber 36. The latter two heat exchange components may be constructed of finned tubes arranged annularly with respect to the axis of the vessel 11 so that a plenum chamber 64 is defined thereby.

An exhaust fan 66, driven by a motor 68, is positioned superjacent the plenum chamber 64. It induces air flow through register 58 and the inlet openings in casing 46, into the intake passageway 48, thence to the burner 12 and next upwardly through the exhaust passageway 44, and finally passing through the annular array of openings 45 in partition 62, then into the plenum chamber 64 for exhaust to the atmosphere. At the same time, cooling atmospheric air is drawn by fan 66 through the condenser 20 and absorber 36 into the plenum chamber 64, from which point it is exhausted to the atmosphere. Heat from the combustion products is transmitted to the vessel 11, the inner surfaces of wall 42, and the studs 40.

The vapor generator 10 is provided interiorly thereof with an upright cylindrical member 72 adjacent to and arranged coaxially of the enlarged lower portion of vessel 11. Within the member 72 is a coiled portion 73 of a tube 74. The inlet end 75 of tube 74 is open to the ammonia solution, since it is positioned just below the liquid level 76 thereof. The outlet end portion of the tube 74 extends upwardly into the analyzer 14 and it is connected with line 33 leading to the heat exchanger 38. As the relatively warm weak solution flows through the coiled portion 73 of tube 74, on its way to the absorber 36, it gives up heat to the somewhat stronger solution draining down into the cylindrical member 72 from the analyzer 14.

During operation of the vapor generator 10, circulation of the liquid in the vessel 11 is as shown by the arrows in FIG. 2, with vaporization taking place in the annular region between the tubular member 72 and the vessel wall as a result of heat being transferred to the vessel wall as described hereinbefore.

The upper end of the tubular member 72 is joined to the vessel 11 adjacent its junction with the analyzer 14. In this region of the tubular member 72, immediately above the liquid level in the vessel 11, rising vapor (ammonia and water) generated in the vessel 11 is mixed with the liquid solution dripping downwardly in the analyzer 14 from lines 17 and 35, with the result that the water vapor contained in the mixed vapors traveling upwardly is absorbed by the stronger solution dripping downwardly and returned to the liquid reservoir in the lower portion of the vessel 11.

The series of vertically spaced horizontally depending baffles 80 are provided within the analyzer 14 to promote the mixing of upwardly moving water vapor and downwardly moving ammonia solution.

The partition 62 is employed, not only to close the upper end of intake passageway 44, and to support the condenser 20 and absorber 36, but also to guide and support the vessel 11 in proper position relative to the insulating wall 42 and the casing 46.

The analyzer portion 14 of the vapor generator 10 extends into the plenum chamber 64; and it is provided with a snugly fitting jacket 70 of insulating material to minimize heat loss to the air circulating through the plenum chamber 64.

It is a feature of the present invention that ambient atmospheric air is drawn into the apparatus and passed through the outer or intake passageway 48, absorbing heat from the insulating wall 42 on its way to the burners 12 so that the heat loss through the insulating wall 42 is beneficially used to preheat the inlet air, with the result that the thermal efficiency of the apparatus is substantially improved and the casing 46 is cooled.

The insulating wall 42 may be of one-piece, cast construction, as shown, or it may be otherwise constructed. In any event, the insulating wall 42 functions to contain the hot combustion gases which heat the contents of the vessel; and, since it itself becomes heated, it radiates heat inwardly toward the vessel and the extended stud surface thereon, while at the same time serving as insulation to modulate the heat transferred to the air in the outer passageway 48.

As shown in the drawings, the ring type gas burner 12 and its ports 13 are arranged adjacent the lower end of the vessel 11 in alignment with the lower end of the exhaust passageway 44. With the ports 13 thus opening to the passageway 44 the generated heating gases travel upwardly through the passageway 44 in heat transfer contact with the studs 40 extending horizontally across substantially the entire width of the passageway 44. It will be noted that the studs 40 extend from the enlarged lower portion of the vessel 11 into the upper portion of he exhaust passageway 44, but not the lower portion of the passageway 44. With the entire lower portion of the vessel wall free of studs 40 there is provided an unobstructed combustion zone in the lower portion of the passageway 44, immediately above the burner 12. With this arrangement there is no direct flame impingement from the burner 12 on the studs 40.

The vapor generator 10 of the present invention is of symmetrical shape and of unitary, compact and simple construction, and therefore it can be efficiently and economically manufactured.

What is claimed is:

1. In an absorption type refrigeration apparatus, a vapor generator unit which comprises an upright enclosed vessel having a lower wall length portion, said vessel containing a liquid, a wall disposed in laterally surrounding, spaced-apart relation to the lower length wall portion of said vessel to define therewith an annular gas flow passage extending upwardly along said lower length wall portion from the lower end of the vessel, annular gas burner means disposed within said passage adjacent to the lower end of said vessel and in peripherally surrounding relation thereto, said gas burner means being disposed for coupling to a fuel gas source to receive fuel gas therefrom for ignition and combustion within said annular passage to liberate hot combustion product gases therein, said burner means located relative to the lower length wall portion of said vessel such hot gases are directed by said burner means for circumferential impingement against the exterior lateral surface of said vessel lower length wall portion above the lower end thereof and directed by said wall to flow upwardly through said annular passage in contact with the exterior lateral surface of said lower length wall portion of the vessel to heat the liquid therein to expel vapors from said liquid.

2. The vapor generator unit according to claim 1 including a plurality of metallic heat transfer members connected to said lower length wall portion of the vessel and extending outwardly therefrom into said annular passage for interaction with the flow of hot combustion gases threrethrough to receive heat from said gases for transfer into said vessel to aid the heating of the liquid therein.

3. The vapor generator unit according to claim 1 wherein said lower length wall portion of the vessel is generally cylindrical, and said wall is made of thermally insulating material and is of cylindrical shell configuration and disposed in radially spaced-apart relation to said lower length portion of the vessel to define said annular passage.

4. A vapor generator comprising a vessel, an insulating wall, and a casing disposed one within the next, respectively, in spaced relation to one another so as to define an intake passageway between said casing and said insulating wall and an exhaust passageway between said insulating wall and said vessel, means providing communication between the lower ends of said passageways, a heater within said insulating wall adjacent the lower end of said vessel, said vessel including wall structure and means intermediate the upper and lower ends thereof which project outwardly into said exhaust passageway and provide said wall structure with extended heat transfer surfaces, and means for conveying air first downwardly through said intake passageway to said heater and exhaust gases upwardly from said heater through said exhaust passageway for heating said vessel.

5. A vapor generator according to claim 4 wherein said insulating wall and said casing are of generally cylindrical shape, said casing has an air inlet means at an upper portion thereof, said intake passageway and said exhaust passageway are of annular cross section, and said air inlet means communicates with an upper portion of said intake passageway so that intake air enters said intake passageway through said air inlet means.

6. A vapor generator according to claim 4 wherein said pressure vessel is vertically elongated, said vessel wall structure is formed about a vertical axis with radially outwardly projecting studs providing said extended heat transfer surfaces, said insulating wall is formed cylindrically about said vertical axis so as to surround said vessel and said heater, and said exhaust passageway and said intake passage are of annular cross section.

7. A vapor generator according to claim 4, adapted for use in an absorption type refrigeration system, wherein the wall structure of said vessel is formed about a vertical axis with radially outwardly projecting studs providing said extended heat transfer surfaces, said intake passageway and exhaust passageway are of annular cross section, said heater is of circular configuration and positioned with said vessel within said insulating wall, and said casing houses the vessel, the cylinder and the heater.

8. A vapor generator according to claim 7 having a heat exchange unit disposed annularly with respect to said vessel and supported thereby to define a plenum chamber therewith, and means positioned adjacent said plenum chamber for moving air through said heat exchange unit and also for moving atmospheric air through said intake passageway to said heater, and exhaust gases from said heater travel upwardly through said exhaust passageway and said plenum chamber.

9. A vapor generator according to claim 8 wherein said heater is a gas burner.

References Cited
UNITED STATES PATENTS

| | | | |
|---|---|---|---|
| 1,692,839 | 11/1928 | Humphrey | 126—350 |
| 1,729,355 | 9/1929 | Munters | 62—497 |
| 1,929,444 | 10/1933 | Murray et al. | 122—367 |
| 2,263,031 | 11/1941 | Estes | 122—19 |
| 2,645,209 | 7/1953 | Digby | 165—105 X |
| 2,985,438 | 5/1961 | Prowler | 158—36 |

FOREIGN PATENTS

| | | |
|---|---|---|
| 766,665 | 4/1934 | France. |

ROBERT A. O'LEARY, *Primary Examiner.*